(12) United States Patent
Bakko

(10) Patent No.: US 11,202,440 B1
(45) Date of Patent: Dec. 21, 2021

(54) LIVESTOCK DEVICE

(71) Applicant: Bakko Bros., Inc., Glenwood, MN (US)

(72) Inventor: Loren Bakko, Glenwood, MN (US)

(73) Assignee: Bakko Bros., Inc., Glenwood, MN (US)

( * ) Notice: Subject to any disclaimer, the term of this patent is extended or adjusted under 35 U.S.C. 154(b) by 3 days.

(21) Appl. No.: 16/985,990

(22) Filed: Aug. 5, 2020

Related U.S. Application Data

(60) Provisional application No. 62/882,842, filed on Aug. 5, 2019.

(51) Int. Cl.
*A01K 1/00* (2006.01)
*A01K 1/06* (2006.01)

(52) U.S. Cl.
CPC .................................. *A01K 1/0613* (2013.01)

(58) Field of Classification Search
CPC ................................ A01K 1/00; A01K 1/0613
USPC ........................................... 119/729–731, 738
See application file for complete search history.

(56) References Cited

U.S. PATENT DOCUMENTS

| 5,065,701 | A | | 11/1991 | Punt | |
|---|---|---|---|---|---|
| 5,109,802 | A | * | 5/1992 | Priefert | A61D 3/00 119/730 |
| 5,626,100 | A | | 5/1997 | Stubbs et al. | |
| 5,908,009 | A | * | 6/1999 | Cummings | A01K 1/0613 119/734 |
| 8,522,726 | B2 | * | 9/2013 | Ulrich | A01K 1/0613 119/734 |
| 2008/0308047 | A1 | | 12/2008 | Mollhagen | |
| 2012/0037090 | A1 | | 2/2012 | Manwaring | |
| 2016/0192618 | A1 | * | 7/2016 | Punt | A01K 1/0613 119/729 |

* cited by examiner

*Primary Examiner* — Richard T Price, Jr.
(74) *Attorney, Agent, or Firm* — Hamilton IP Law, PC; Jay R. Hamilton; Charles A. Damschen

(57) ABSTRACT

In one aspect of a livestock device, the livestock device may be configured with two opposed and corresponding door frames. A neck bar may be engaged with each door frame via an upper extension arm and a lower extension arm. The door frames may be selectively moved between an open and closed position with respect to one another. The neck bars may be selectively moved between a retracted and extended position with respect to the door frames. The livestock device may be configured to secure the position of, restrain, and/or properly orient an animal, and/or to secure the position of, restrain, and/or properly orient a portion of an animal (e.g., its head, neck, etc.) with respect to another portion of the animal.

20 Claims, 17 Drawing Sheets

LIVESTOCK DEVICE

CROSS REFERENCE TO RELATED APPLICATIONS

The present nonprovisional utility patent application claims the filing priority of provisional U.S. Pat. App. No. 62/882,842 filed on Aug. 5, 2019, which application is incorporated by reference herein in its entirety.

FIELD OF THE INVENTION

The present disclosure relates to a device for securing livestock, and more specifically a livestock device for securing a relatively larger animal, such as a bovine.

AUTHORIZATION PURSUANT TO 37 C.F.R. § 1.171 (c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Various livestock securing and positioning devices exists. Examples of issued patents and published patent applications for such devices include U.S. Pat. Nos. 5,065,701; 5,626,100; Published U.S. Pat. App. Nos. 2008/0308047; and 2012/0037090. However, such devices have various disadvantages in certain applications.

BRIEF DESCRIPTION OF FIGURES

The accompanying drawings, which are incorporated in and constitute a part of this specification, illustrate embodiments and together with the description, serve to explain the principles of the methods and systems.

DETAILED DESCRIPTION LISTING OF THE ELEMENTS

Figure 1:
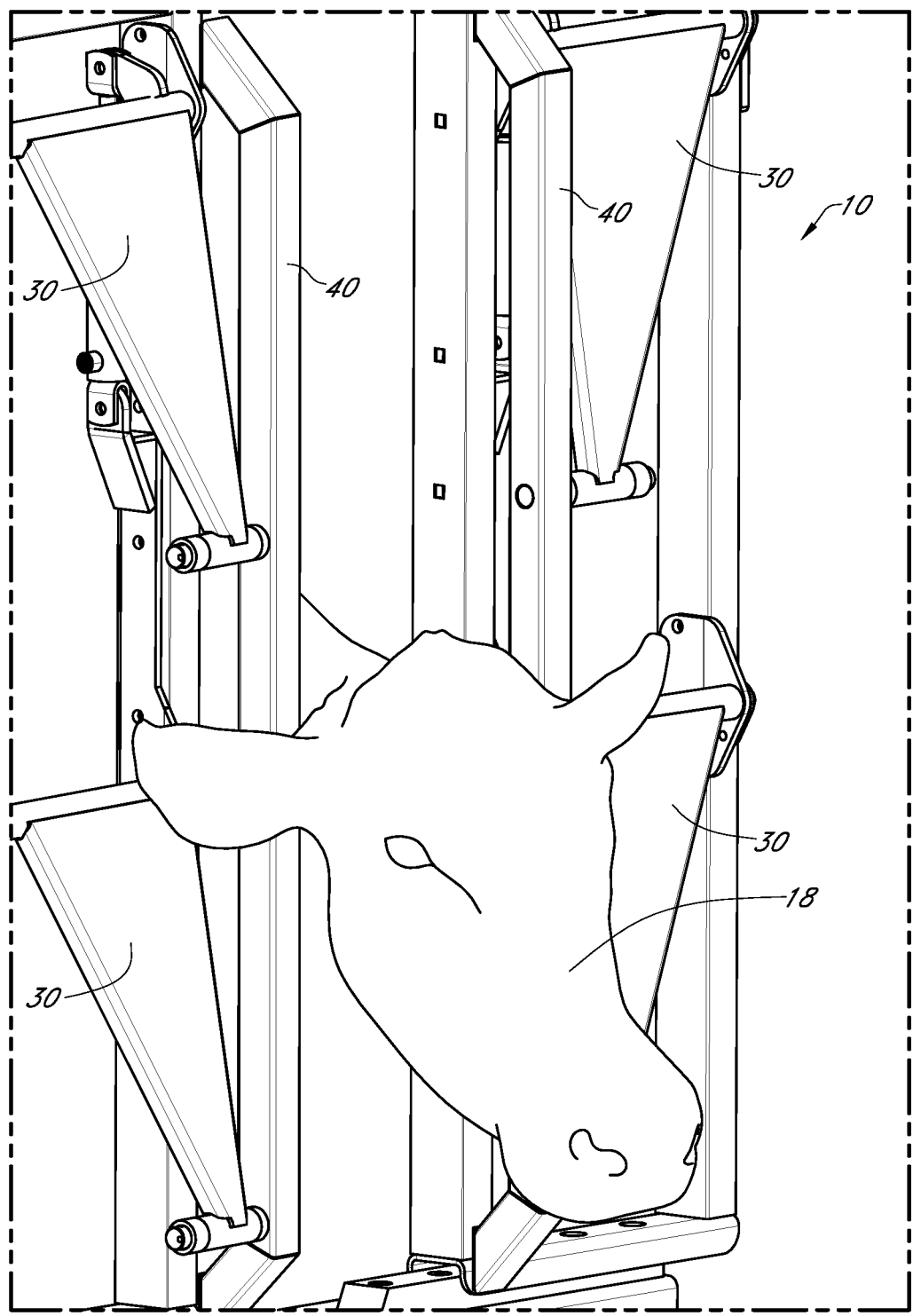
FIG. 1 is a perspective view of an illustrative embodiment of the livestock device with an animal engaged therewith.

| Element Description | Element Number |
|---|---|
| Livestock device | 10 |
| Chute | 12 |
| Actuator | 14 |
| Guide | 16 |
| Support structure | 17 |
| Animal | 18 |
| Door frame | 20 |
| Upper mount | 21 |
| Telescoping member | 21a |
| Vertical member | 22 |
| Attachment tab | 22a |
| Actuator bracket | 22b |
| Slide tab | 22c |
| Horizontal member | 24 |
| Rod | 25 |
| Keeper | 26 |
| Extension arm | 30 |
| Arm first end | 32 |
| Actuator tab | 32a |
| Arm second end | 34 |
| Bushing | 35 |
| Neck bar | 40 |
| Angled portion | 40a |
| Spacer | 42 |
| Stop | 44 |

DETAILED DESCRIPTION OF INVENTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed herein are various components that may be used to perform the disclosed methods and provide the disclosed systems. These in addition to other components that may be compatible with the disclosed methods and systems, and it is understood that when combinations, subsets, interactions, groups, etc. of these components are disclosed, that while specific reference of each various individual and collective combinations and permutation of these may not be explicitly disclosed, each is specifically contemplated and described herein, for all methods and systems of the present disclosure. This applies to all aspects of this disclosure including, but not limited to, steps in disclosed methods. Thus, if there are a variety of additional steps that may be performed, it is understood that each of these additional steps may be performed with any specific aspects or combination of aspects of the disclosed methods.

The present methods and systems may be understood more readily by reference to the following detailed description of systems and methods (including the various aspects thereof) and the examples included therein and to the Figures and their following description. Further, although some figures included herewith show various dimensions of some features of certain illustrative aspects of certain components of the present disclosure, such dimensions are for illustrative purposes only and in no way limit the scope of the present disclosure unless so indicated in the following claims.

The following detailed description is of the best currently contemplated modes of carrying out the present methods and systems. The description is not to be taken in a limiting sense, but is made merely for the purpose of illustrating the general principles of the various aspects of the present disclosure, since the scope of the invention is best defined by the appending claims. Various inventive features are described below herein that can each be used independently of one another or in combination with other features without limitation unless so indicated in the following claims.

Figure 2:
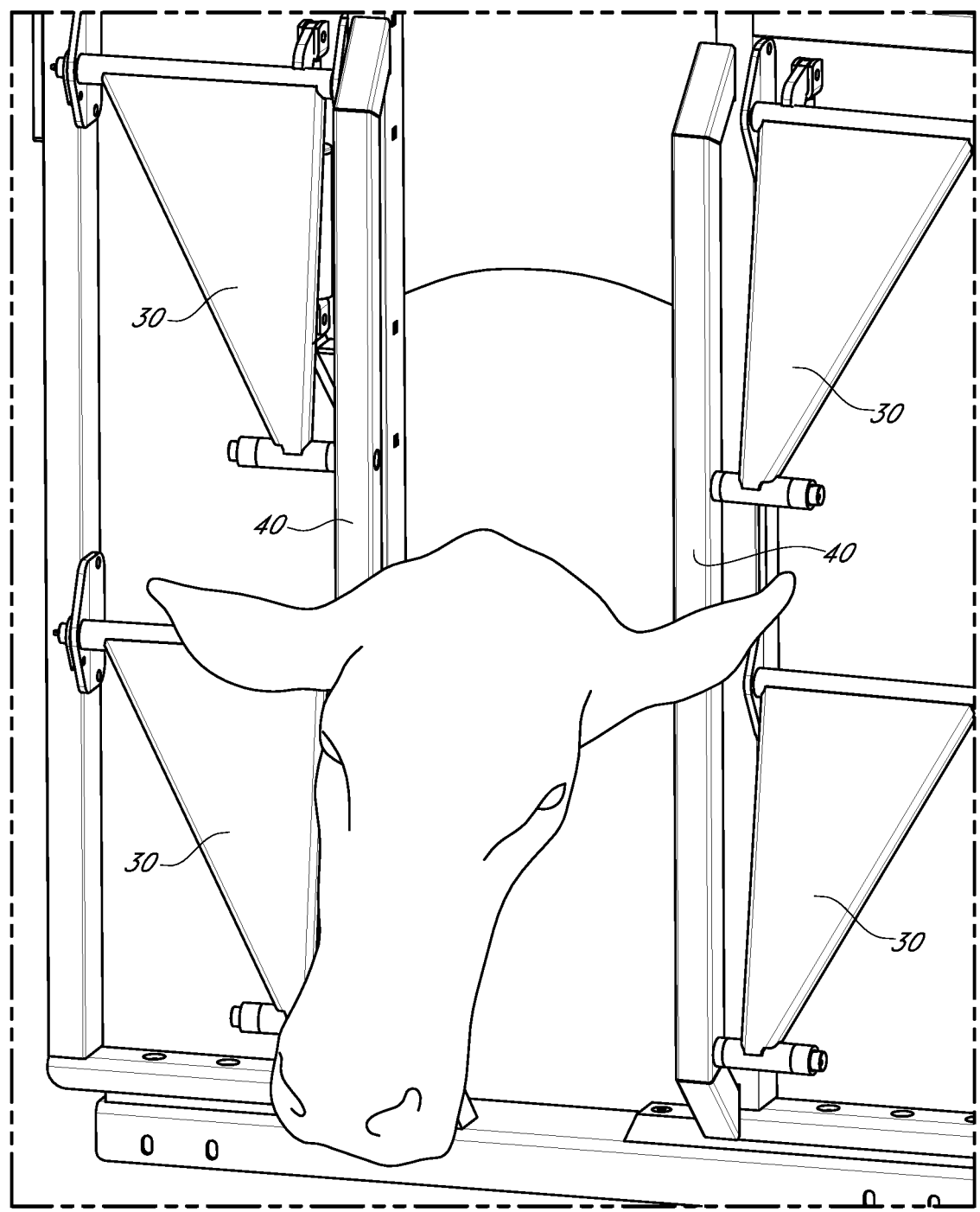
FIG. 2 is a front view of the livestock device and animal shown in FIG. 1.
Figure 3:
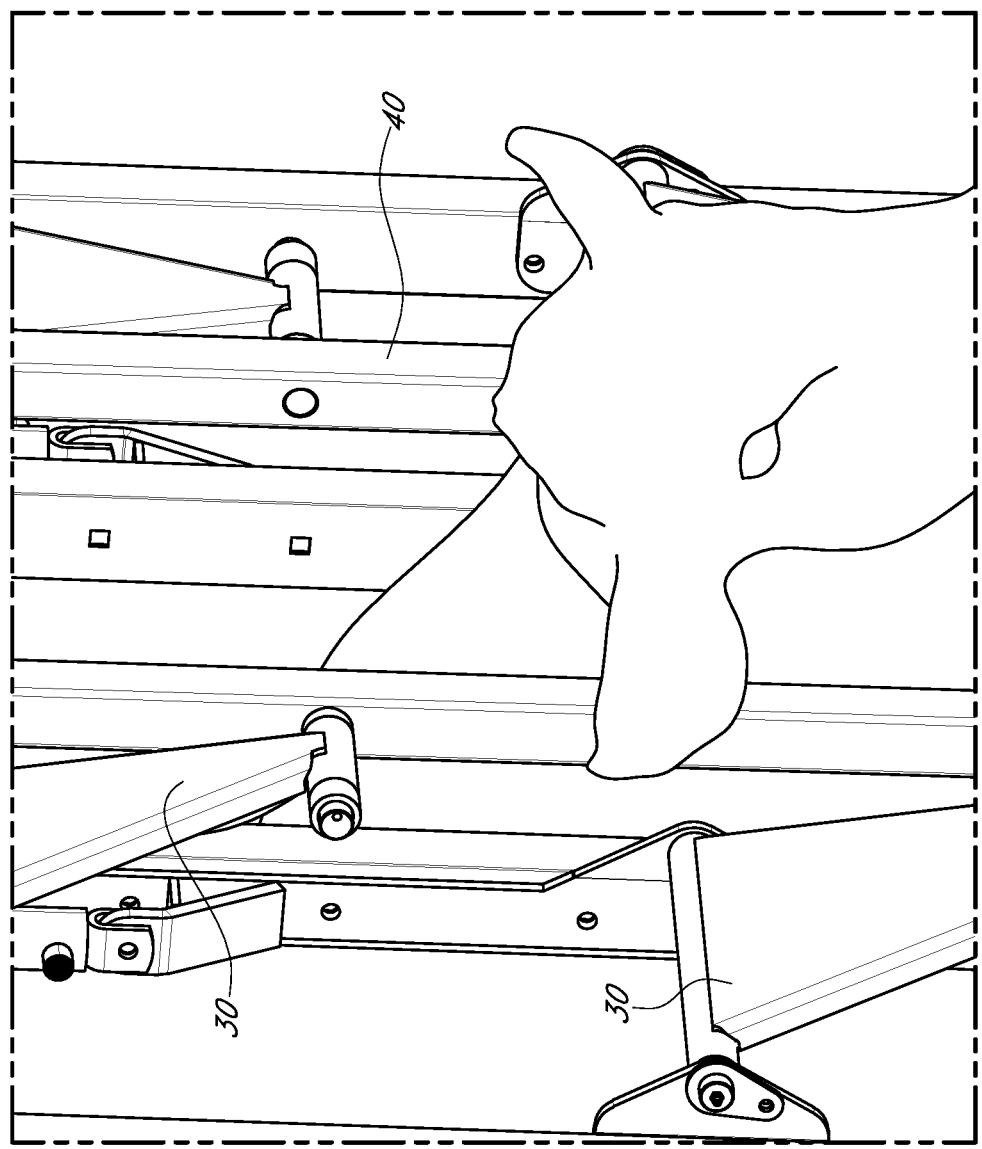
FIG. 3 is a detailed perspective view of the livestock device shown in FIGS. 1 & 2.

Referring generally to FIGS. 1-3, a first illustrative embodiment of a livestock device 10 may be engaged with an end of a chute 12, wherein the livestock device 10 and chute 12 may be configured to secure the position of, restrain, and/or properly orient an animal 18, and/or to secure the position of, restrain, and/or properly orient a portion of an animal 18 (e.g., its head, neck, etc.) with respect to another portion of the animal 18. It is contemplated that the livestock device 10 disclosed herein may be especially useful for veterinary care of an animal 18, but the scope of the present disclosure is not so limited unless otherwise indicated in the following claims. Although the various illustrative embodiments of the livestock device 10 pictured and disclosed herein may be especially adapted for use with cows, the scope of the present disclosure is not so limited unless otherwise indicated in the following claims, and other embodiments may be adapted for use with sheep, goats, swine, etc. Additionally, the livestock device 10 may be adapted to selectively engage an end of nearly any type of chute 12 and is in no way limited by the type of chute 12 for which it is adapted unless otherwise indicated in the following claims. It is contemplated that the livestock device 10 may be integrally formed with a chute 12 or it may be separately formed and later engaged with the chute 12 (i.e., via mechanical fasteners, welding, and/or any suitable method and/or structure) without limitation unless otherwise indicated in the following claims.

Figure 4A:
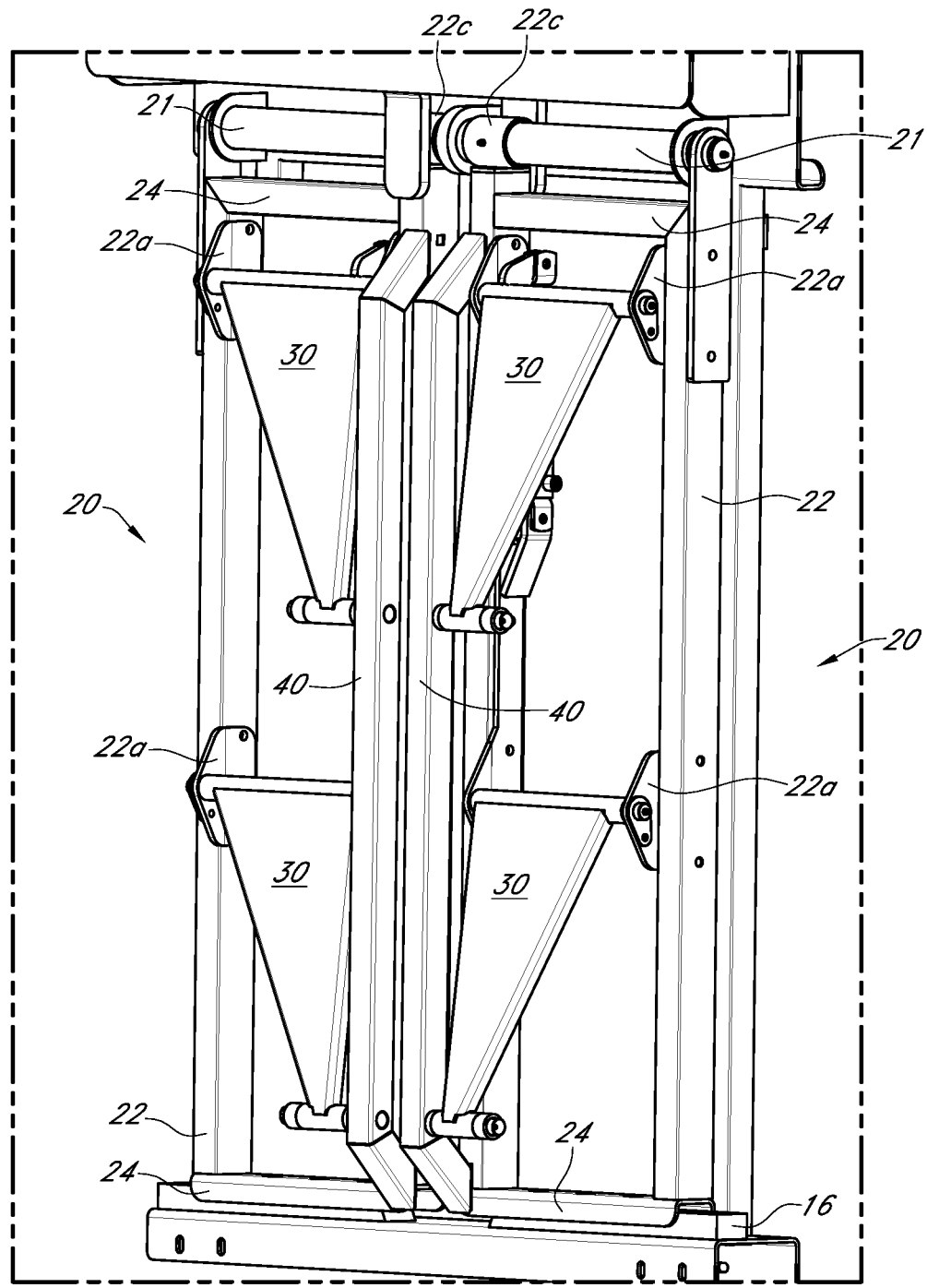
FIG. 4A is a perspective view of another illustrative embodiment of the livestock device with the door frames closed and the neck bars in the retracted position.

Referring now generally to FIGS. 4A-10, which provide various views of a second illustrative embodiment of the livestock device 10, generally, the livestock device 10 may be comprised of two door frames 20. Each door frame 20 may be moveable with respect to one another and with respect to the chute 12 in a generally horizontal dimension such that the door frames 20 may be moved between a closed position wherein the door frames 20 are positioned adjacent one another (as shown in FIG. 4A) such that an animal 18 (and/or portion of the animal 18 such as its head) may not pass between the door frames 20 and an open position wherein the door frames 20 are spaced apart from one another (as shown in FIG. 4B) such that an animal 18 (and/or portion of the animal 18 such as its head) may pass between the door frames 20. Additionally, the door frames 20 may be fixed at any position therebetween (as shown in FIGS. 1-3) when the livestock device 10 is in use with an animal 18, and wherein a portion of the animal 18 (such as its neck) may be positioned between the door frames 20.

In the illustrative embodiments of the livestock device 10, each door frame 20 may be comprised of two vertical members 22 and two horizontal members 24 engaged with one another such that each door frame 20 is generally rectangular in shape. An upper mount 21 may be engaged with the chute 12 above a corresponding door frame 20 and a telescoping member 21a may be moveable with respect to the upper mount 21, wherein the telescoping member 21a may be fixedly engaged with a vertical member 22 and/or horizontal member 24 of a respective door frame 20. Generally, the upper mount 21 may be configured as a hollow tube into which the telescoping member 21a and/or a portion thereof may fit in a slideable manner. However, in other embodiments the upper mount 21 and/or telescoping member 21a may be differently configured without limitation unless otherwise indicated in the following claims.

Figure 4B:
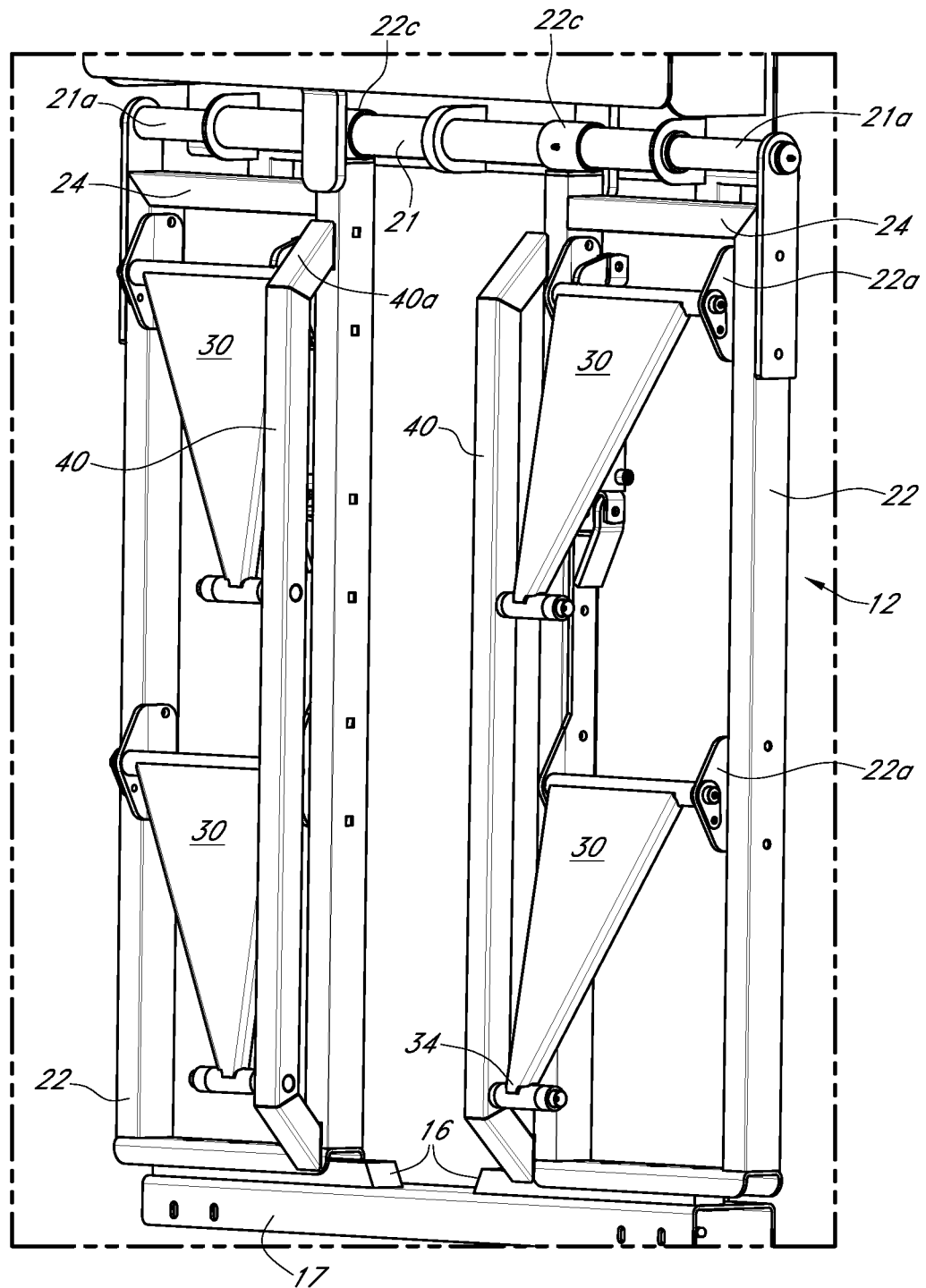
FIG. 4B is a perspective view of the livestock device shown in FIG. 4A with the door frames fully open and the neck bars in the retracted position.
Figure 4C:
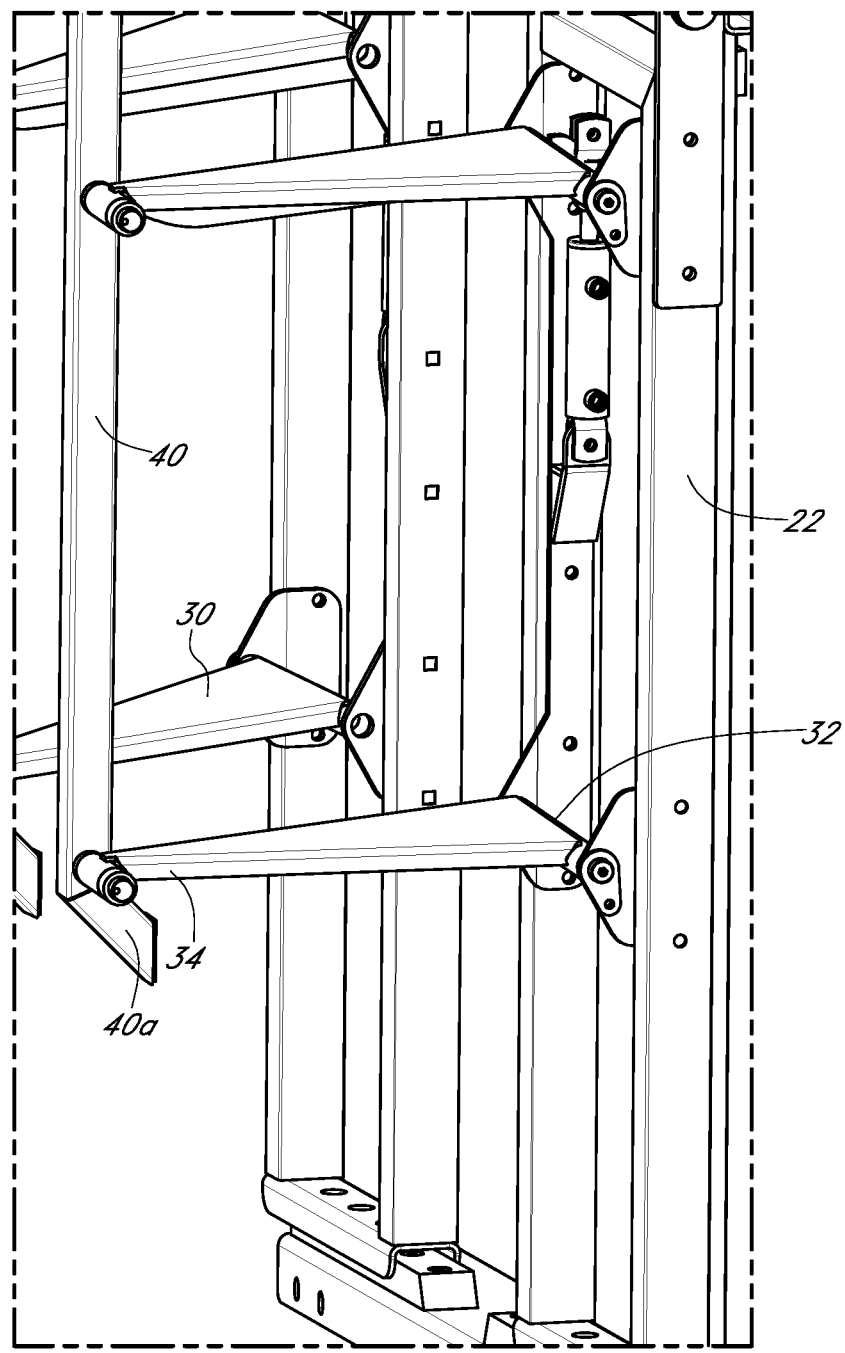
FIG. 4C is a perspective view of the livestock device shown in FIGS. 4A & 4B with the door frames closed and the neck bars in the extended position.
Figure 5:
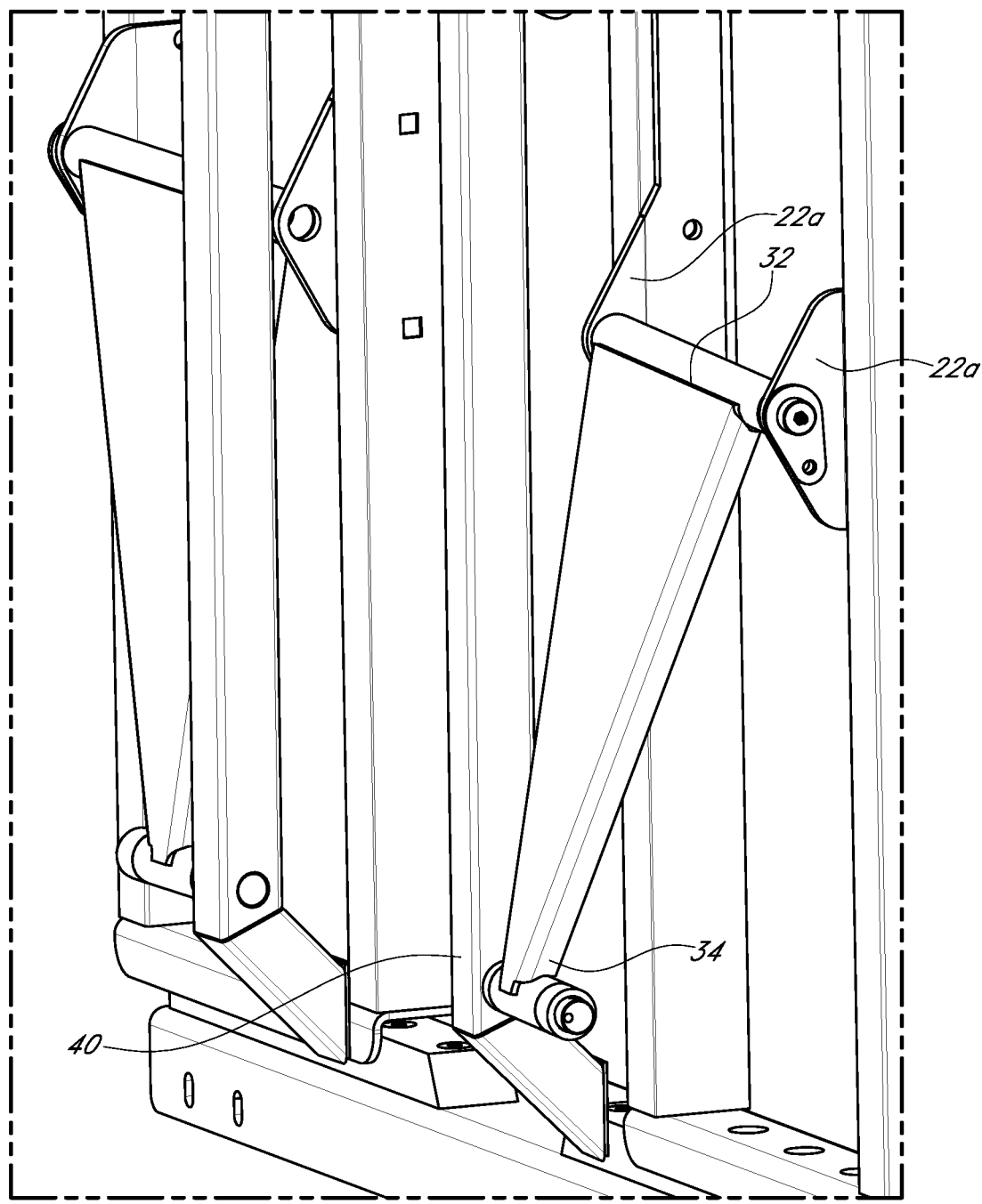
FIG. 5 is a detailed view of a portion of the livestock device shown in FIGS. 4A-4C adjacent an extension arm.

The inner vertical members 22 may be formed with a slide tab 22c at the upper end thereof, wherein the slide tab 22c may engage an exterior surface of the upper mount 21 in a sliding fashion so that the slide tab 22c may be moveable in the generally horizontal dimension with respect to the upper mount 21. As shown in FIG. 4A, when the door panels 20 are closed, each telescoping member 21a may be positioned within the upper mount 21 and each slide tab 22c on the opposing door frames 20 may be positioned adjacent one another. As shown in FIG. 4B, when the door panels 20 are opened each telescoping member 21a may be extended out from the upper mount 21 and each slide tab 22c may be separated from one another by a distance approximately equal to the opening between the two inner vertical members 22 of the opposing door frames 20. The upper mount 21 and telescoping member 21a may be configured to reduce the overall width of the livestock device 10 and/or to provide a limit to the overall width thereof without limitation unless otherwise indicated in the following claims. Additionally, the upper mount 21 and telescoping member 21a may be configured to provide a limit to the width of an opening between the two door frames 20 without limitation unless otherwise indicated in the following claims.

The door frames 20 may be actuated between open and closed positions and/or any position therebetween via one or more actuators 14. A guide 16, which may be manufactured from or coated with a generally lubricious material (e.g., polytetrafluoroethylene, other polymers, grease, and/or combinations thereof) may be engaged with the bottom horizontal member 24 of each door frame 20 so as to reduce friction between the door frame 20 and support structure 17 (which support structure 17 may be configured as a portion of the chute 12 or which may be configured as a portion of the livestock device without limitation unless otherwise indicated in the following claims) with which the door frame 20 is engaged during actuation of the door frame 20. Such friction reducing structures and/or methods may be used at any contact area of the livestock device 10 including but not limited to the upper mount 21 and telescoping member 21*a*, upper mount 21 and slide tab 22*c*, rod 25 and extension arm 30, extension arm 30 and neck bar 40, etc. without limitation unless otherwise indicated in the following claims.

It is contemplated that engaging the upper end of an outer vertical member 22 of a given door frame 20 to an outer terminal end of a corresponding telescoping member 21*a* and engaging the upper end of an inner vertical member 22 of that door frame 20 to a corresponding slide tab 22*c* may prevent and/or mitigate misalignment between that door frame 20 and other components of the livestock device 10 and/or a chute 12 and/or ensure proper actuation and/or movement of that door frame 20 without limitation unless otherwise indicated in the following claims.

Figure 9:
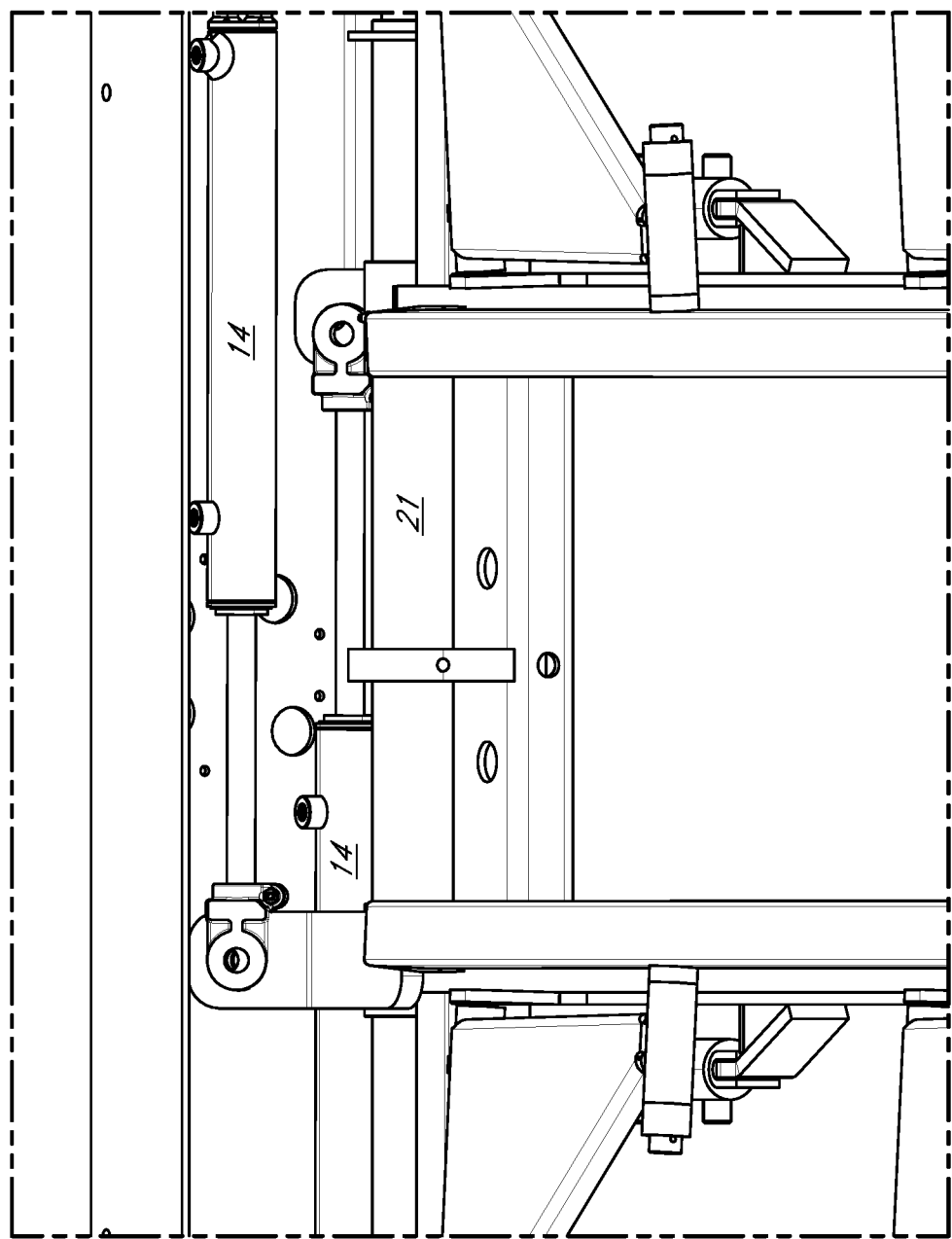
FIG. 9 is a detailed view of an upper portion of the livestock device and associated elements of the livestock device shown in FIGS. 4A-8.
Figure 10:
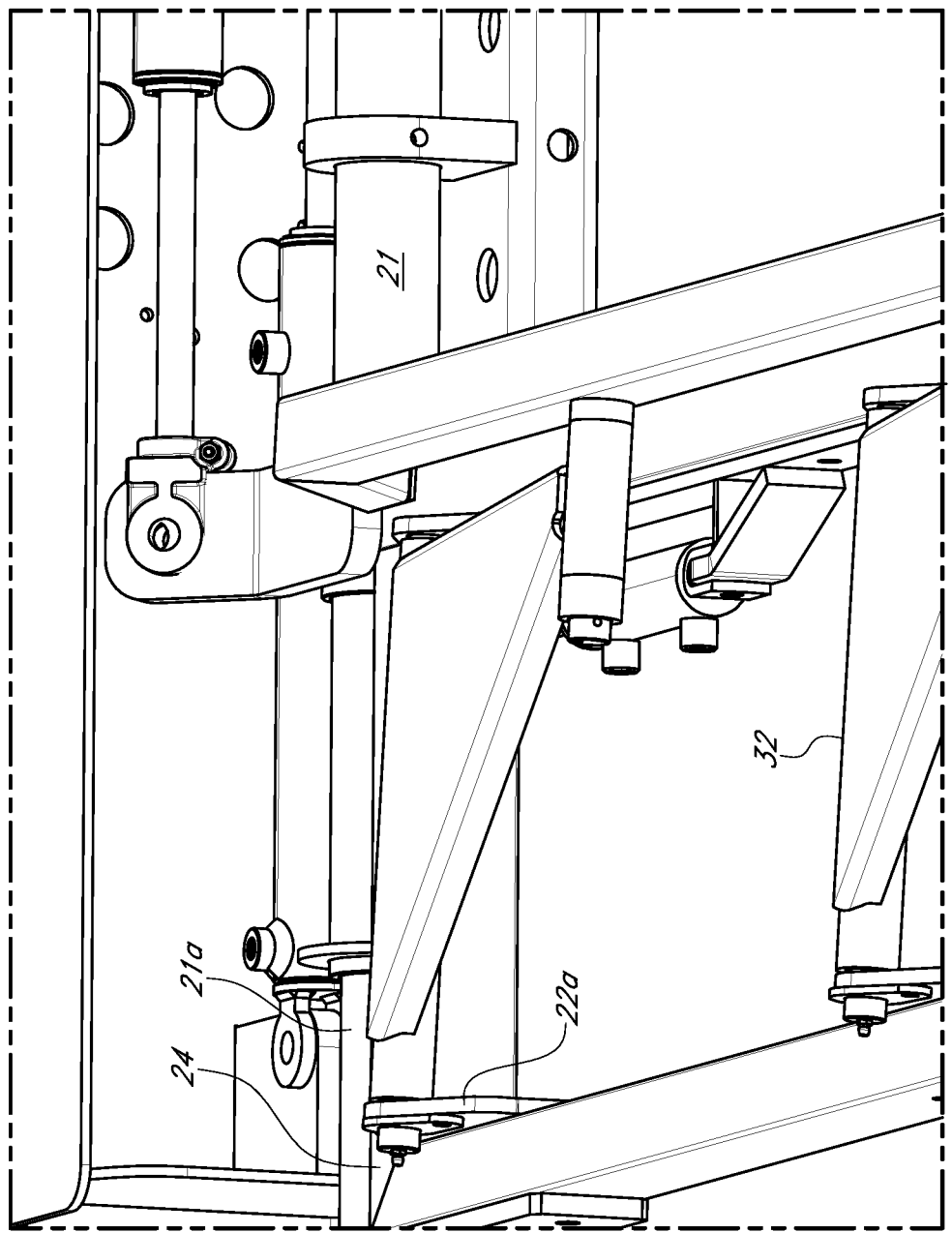
FIG. 10 is a detailed view of an upper portion of one door frame of the livestock device and associated elements shown in FIGS. 4A-9.

As shown at least in FIG. 9, the second illustrative embodiment of the livestock device 10 may be configured with two actuators 14 configured to open and close the door frames 20, wherein the actuators 14 may be hydraulically powered. A first end of an actuator 14 may be engaged with a slide tab 22*c* that is fixedly engaged with a vertical member 22 of a door frame 20 and a second end of that actuator 14 may be engaged with an upper mount 21. In this manner, one actuator 14 may power a first door frame 20 and a second actuator 14 may power a second door frame 20. However, the scope of the present disclosure is not so limited and extends to more than two or fewer than two actuators 14 as well as actuators 14 having different power sources (e.g., electric, pneumatic, etc.) and/or different configurations without limitation unless otherwise indicated in the following claims.

Figure 12A:
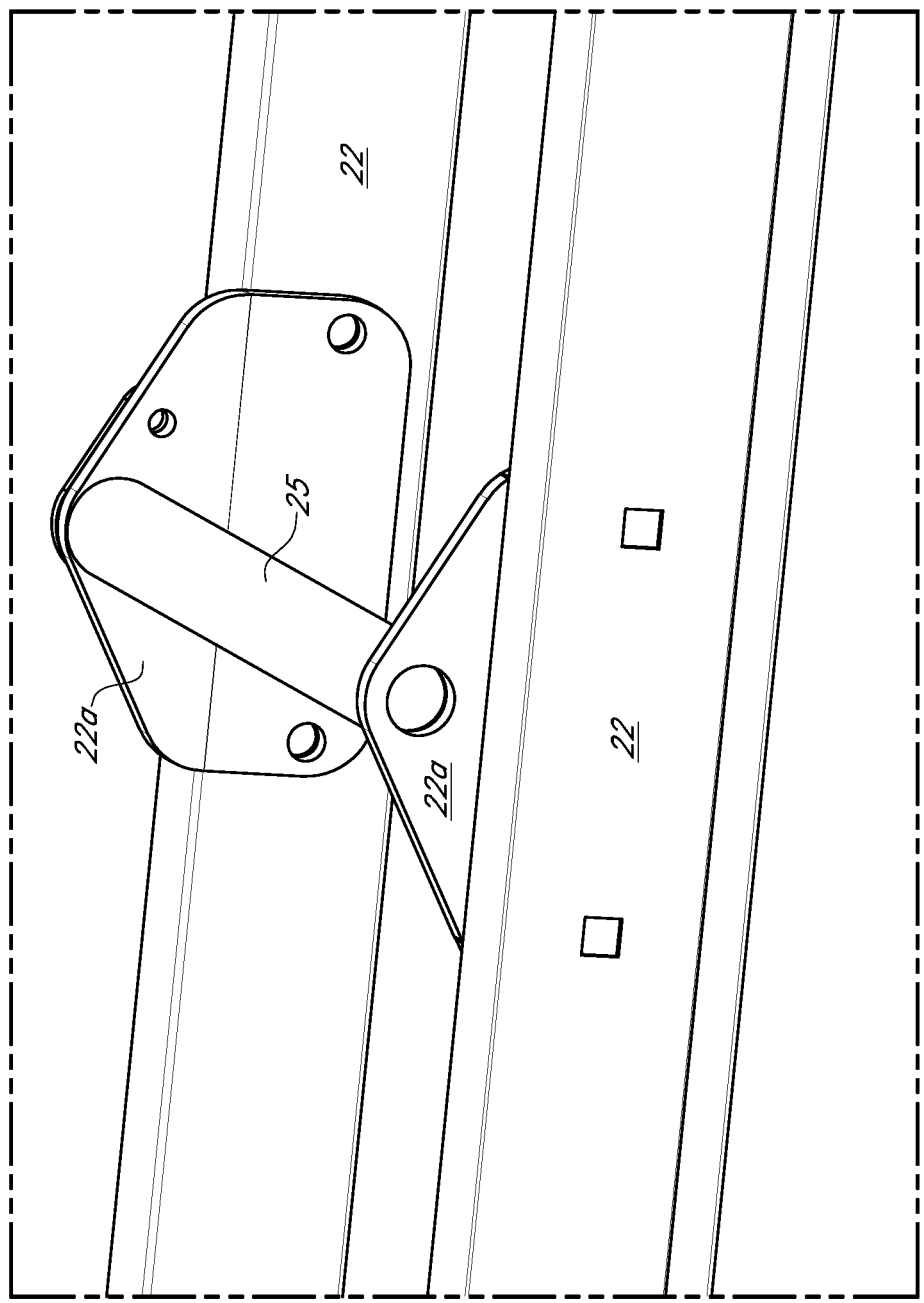
FIGS. 12A-12D provide various detailed views of the door frame shown in FIGS. 4A-10 adjacent the attachment tabs.
Figure 12B:
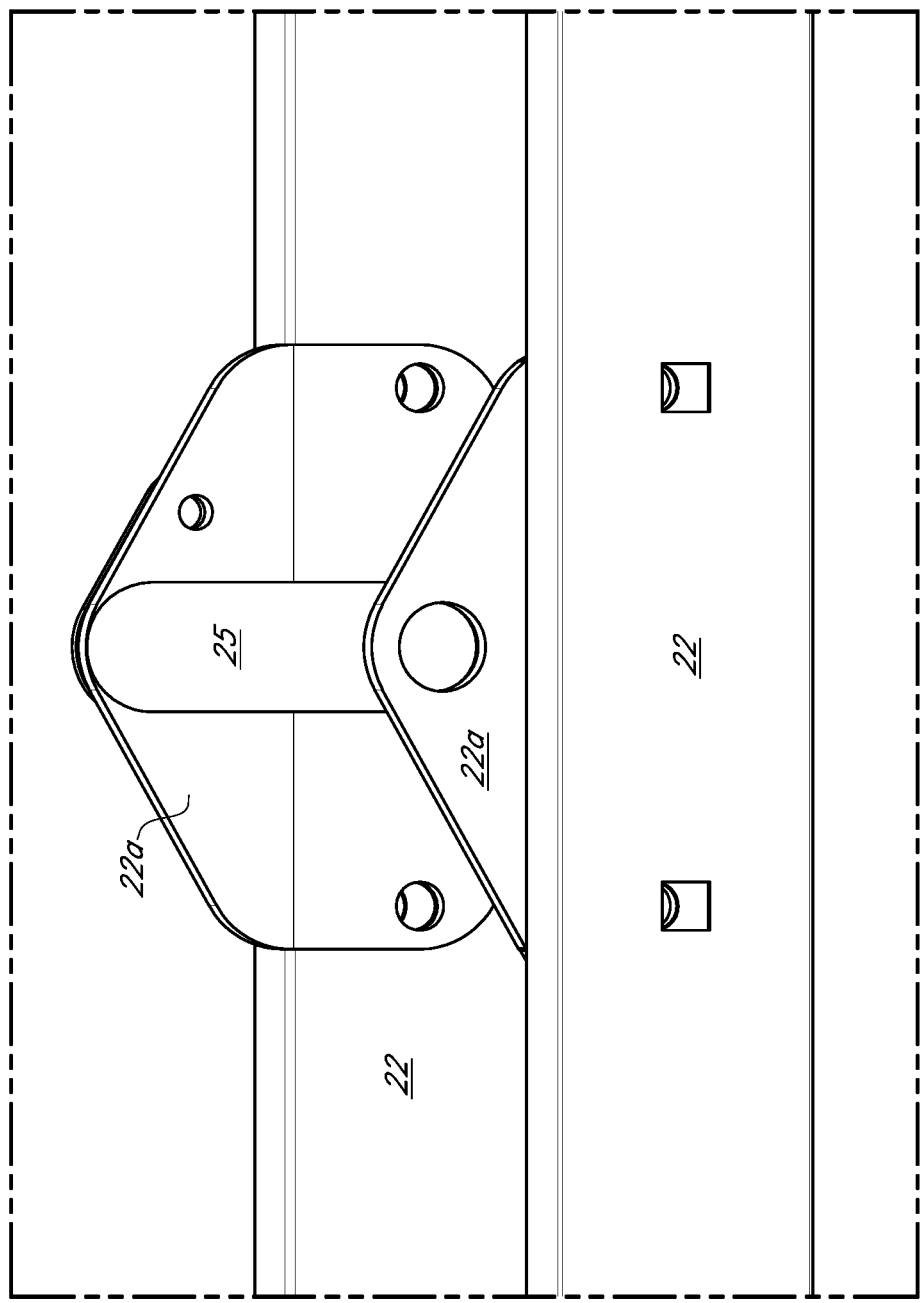
Figure 12C:
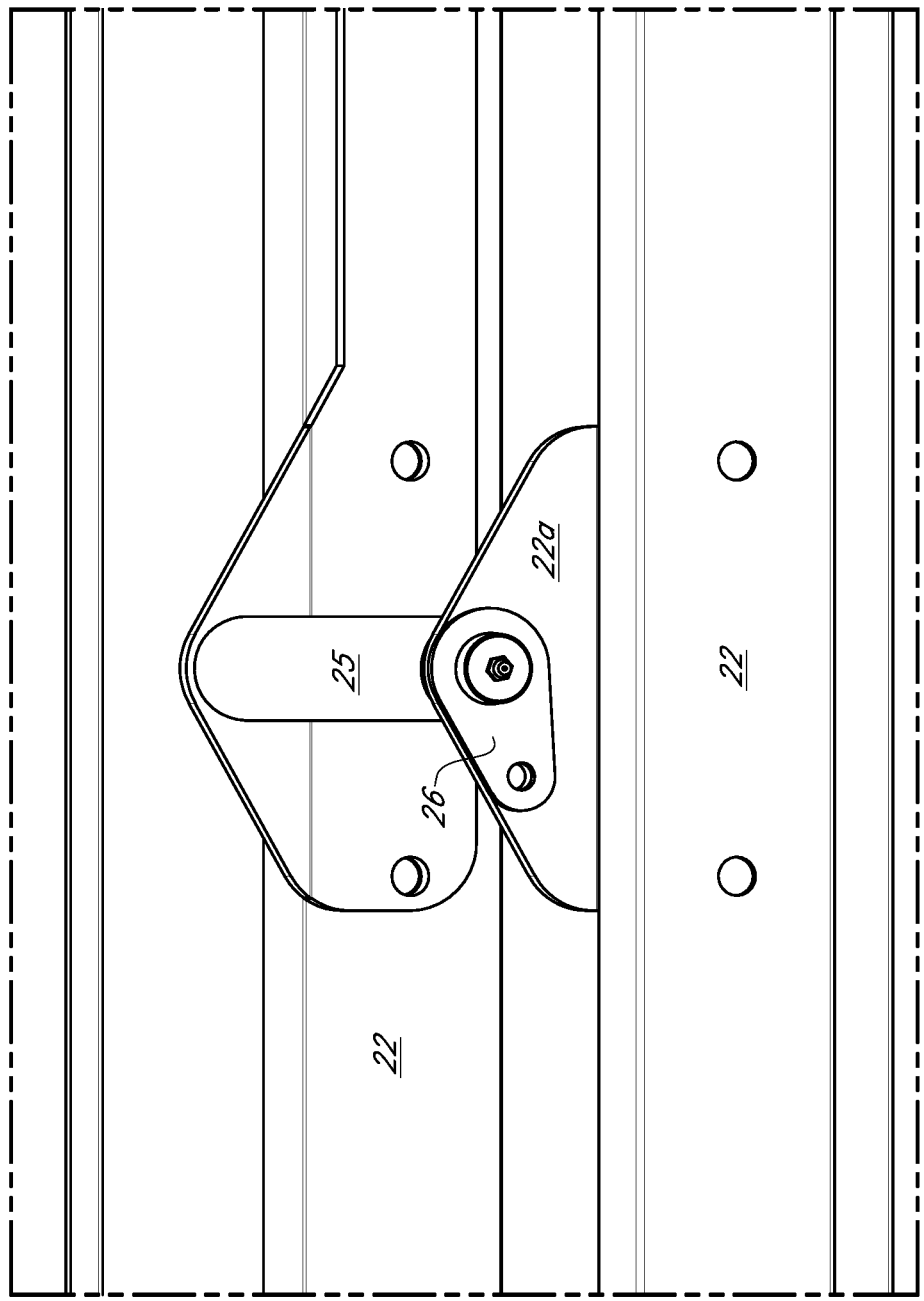
Figure 12D:
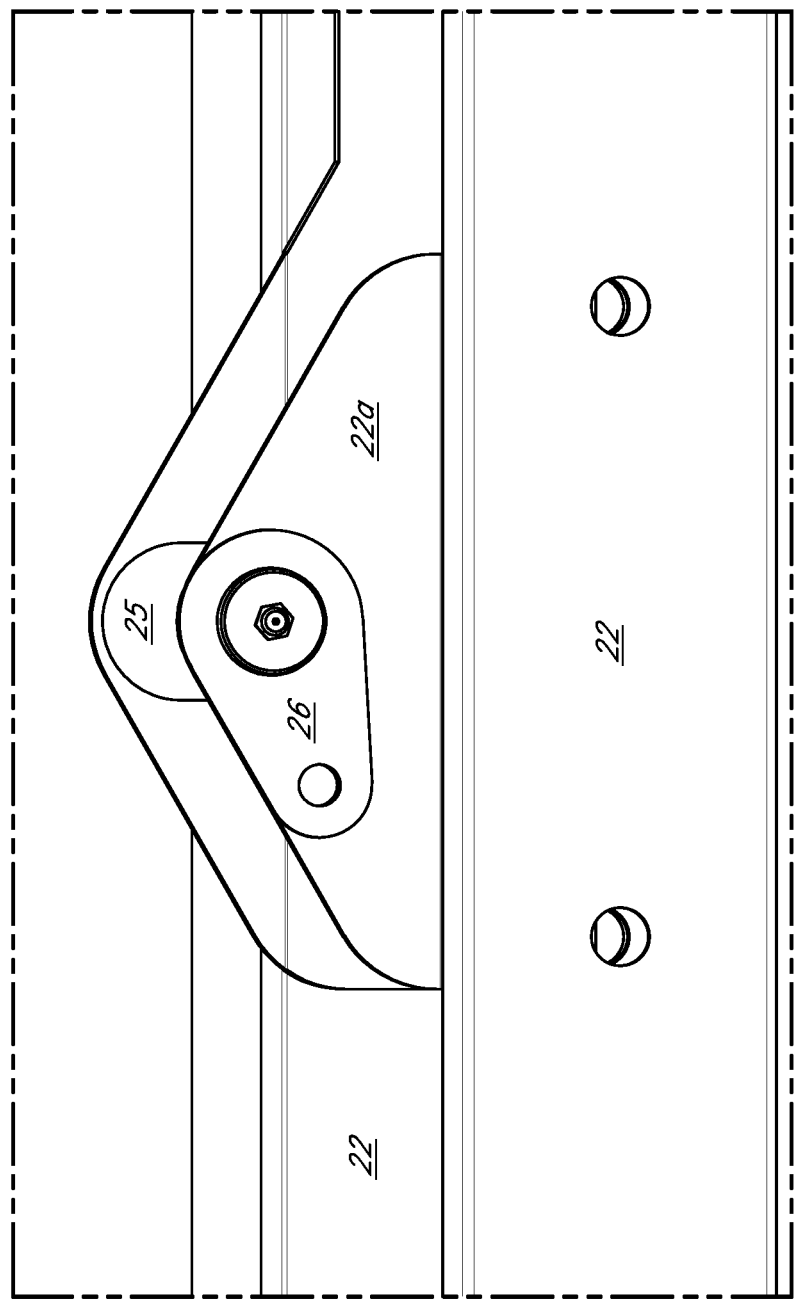

Two pairs of extension arms 30 may be pivotally engaged with each respective door frame 20 at attachment tabs 22*a*, which attachment tabs 22*a* may be selectively engaged with the vertical members 22. An upper extension arm 30 and lower extension arm 30 may be pivotally engaged with each door frame 20 as further described in detail below and may constitute one pair of extension arms 30. Detailed views of an illustrative embodiment of the attachment tabs 22*a* are shown in FIGS. 12A-12D. A first vertical member 22 (which may be an outer vertical member 22) and corresponding attachment tab 22*a* for a door frame 20 is shown in the foreground of FIGS. 12A & 12B and the opposing vertical member 22 (which may be an inner vertical member) and corresponding attachment tab 22*a* for that door frame 20 is shown in the foreground of FIGS. 12C & 12D. The attachment tabs 22*a* may be configured such that they may be engaged with and/or adjusted with respect to the vertical members 22 in a selective manner (e.g., with mechanical fasteners such as bolts, nuts, screws, etc.) so that the attachment tabs 22*a* may be removed and disengaged from the vertical members 22 if desired. However, the scope of the present disclosure is not so limited, and in other embodiments of the livestock device 10 the attachment tabs 22*a* may be otherwise engaged with and/or adjusted with respect to the vertical members 22 without limitation unless otherwise indicated in the following claims.

A rod 25 may extend between two attachment tabs 22*a* on vertical members 22 (i.e., the inner and outer vertical members 22) of a single door frame 20. It is contemplated that each door frame 20 may be configured with two corresponding pairs of attachment tabs 22*a*, wherein one pair is positioned above a second pair such that the upper pair is associated with the upper extension arm 30 on that door frame 20 and the lower pair is associated with the lower extension arm 30 on that door frame 20. The rod 25 between two attachment tabs 22*a* of a pair of attachment tabs 22*a* may extend the entire distance between two vertical members 22 of a single door frame 20. It is contemplated that such a configuration will provide additional strength and durability to the livestock device 10 and ensure proper movement of the extension arms 30 and/or neck bars 40 with respect to the door frame 20 (as described in detail below) without limitation unless otherwise indicated in the following claims.

A keeper 26, as shown at least in FIGS. 12C & 12D, may be engaged with one attachment tab 22*a* of a corresponding pair of attachment tabs 22*a*, which may be via selective engagement using mechanical fasteners (e.g., nuts and bolts, screws, etc.) without limitation unless otherwise indicated in the following claims. The keeper 26 may be secured to the rod 25 to facilitate removal and installation of the rod 25 with the corresponding attachment tabs 22*a* as well as to secure the position of the rod 25 with respect to the attachment tabs 22*a* (and consequently the door frame 20) without limitation unless otherwise indicated in the following claims. In this manner, the rod 25 and keeper 26 may be configured such that they may be engaged with and/or adjusted with respect to the vertical members 22 in a selective manner (e.g., with mechanical fasteners such as bolts, nuts, screws, etc.) so that the keepers 26 and rods 25 may be removed and disengaged from the vertical members 22 if desired. However, the scope of the present disclosure is not so limited, and in other embodiments of the livestock device 10 the rods 25 and/or keepers 26 may be otherwise engaged with and/or adjusted with respect to the vertical members 22 without limitation unless otherwise indicated in the following claims.

Each extension arm 30 may be comprised of an arm first end 32 and an arm second end 34, wherein each arm end 32, 34 may be generally cylindrical in shape without limitation unless otherwise indicated in the following claims. The arm first end 32 may be positioned over the rod 25 and pivotable with respect thereto (and consequently with respect to the corresponding door frame 20), such that the rod 25 or a portion thereof is positioned within the cylindrical portion of the arm first end 32. The arm second end 34 may be engaged with a corresponding neck bar 40 and pivotable with respect thereto. The arm second end 34 may be positioned over a shaft (not shown) engaged with the corresponding neck bar 40 (and which shaft may be integrally formed with a neck bar 40 or formed separately and engaged therewith), but any suitable structure and/or method for providing a pivotal engagement between the extension arm 30 and door frame 20 and/or between the extension arm 30 and neck bar 40 may be used without limitation unless otherwise indicated in the following claims. Generally, it is contemplated that the configuration of the attachment tabs 22*a* for selective engagement with and/or adjusted with respect to the vertical members 22 as previously described may allow for relatively easy engagement with and/or adjustment of the extension arms 30 and/or neck bars 40 with respect to the door frames 20 without limitation unless otherwise indicated in the following claims.

Furthermore, the distance between the interior surfaces of the two opposing neck bars 40 may be less than the distance between the interior surfaces of the two opposing vertical members 22 of each door frame 20. In one illustrative embodiment the neck bars 40 may be at least four inches closer to one another than the inner vertical members 22 of each door frame 20. In another illustrative embodiment the difference may be at least six inches. However, the optimal value for this difference in distance may vary from one application of the livestock device 10 to the next and is therefore in no way limiting to the scope of the present disclosure unless otherwise indicated in the following claims. Additionally or alternatively, the extension arms 30 may be configured such that when they are extended away from their respective door frame 20, the distance between the interior surfaces of the two opposing neck bars 40 may decrease compared to that same distance when the extension arms 30 are retracted. Generally, it is contemplated that this difference in distances and/or configuration of the extension arms 30 may allow for a gradual taper along the neck of an animal 18 from the base thereof to the head of the animal 18, which may provide increased comfort for the animal 18, and/or mitigate and/or eliminate potential harm, pinching, or other unwanted outcomes, and/or more securely restrain the animal 18 and/or a portion thereof when using the livestock device 10 without limitation unless otherwise indicated in the following claims.

Figure 11:
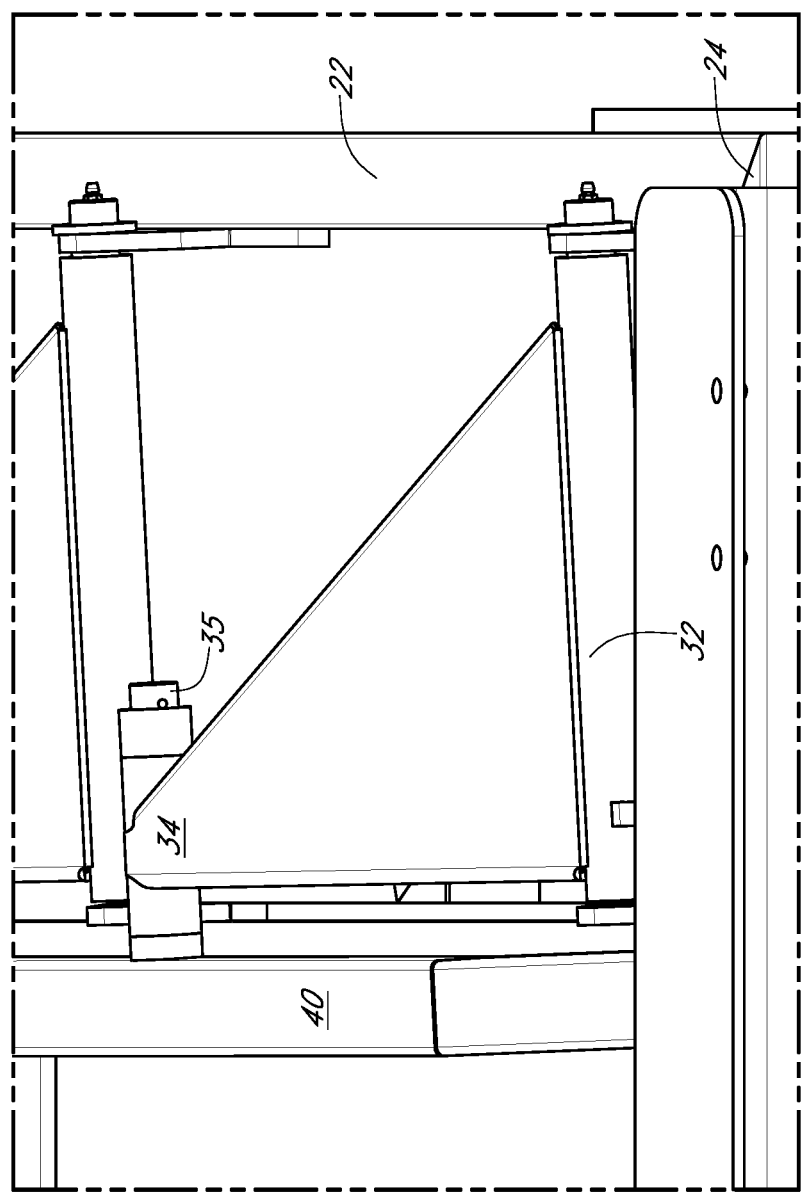
FIG. 11 is a detailed view of an upper portion of one door frame of the livestock device and associated elements shown in FIGS. 1-3.

One or more bushings 35 as shown at least in FIG. 11 may be positioned adjacent either the arm first or second ends 32, 34, wherein the bushing(s) 35 may be positioned over a shaft (not shown) engaged with a neck bar 40 or a rod 25. It is contemplated that bushing(s) 35 may be used to adjust the minimum and/or maximum clearance between the two neck bars 40 such that the livestock device 10 may be configured for use with a wide variety of sizes of animals 18 without limitation unless otherwise indicated in the following claims.

The livestock device 10 may be configured with two opposed neck bars 40, wherein each neck bar 40 corresponds to one door frame 20. The length of the neck bars 40 may be similar to the length of the vertical members 22 of a given door frame 20 so as to prevent unwanted movement of an animal 18 with respect to the neck bars 40 when the animal 18 is engaged therewith. In one embodiment the length of the neck bars 40 may be at least sixty percent that of the vertical members 22 and in another embodiment at least 75 percent, but the scope of the present disclosure is not so limited unless otherwise indicated in the following claims.

The neck bars 40 may be formed with one or more spacers 41 on an inner surface thereof as shown in FIGS. 1-3 and 11. It is contemplated that such spacers 41 may provide additional comfort and/or safety for an animal 18 engaged with the livestock device 10 by preventing and/or mitigating the neck bars 40 from pinching and/or unwanted and/or unsafe squeezing a portion of an animal 18 without limitation unless otherwise indicated in the following claims. The neck bars 40 may be engaged with the arm second end 34 of each extension arm 30 of a given pair of extension arms 30. That is, each neck bar 40 may correspond to one door frame 20 and one pair of extension arms 30 (i.e., an upper and a lower extension arm 30). However, the scope of the present disclosure is not so limited and other orientations, configurations, and/or numbers of extension arms 30 may be used without limitation unless otherwise indicated in the following claims.

In an illustrative embodiment, either end of a neck bar 40 may be formed with an angled portion 40a. The angled portion 40a may protrude inward toward the door frame 20 such that when the neck bars 40 are in the fully retracted position (as shown at least in FIGS. 4A & 4B), a gap remains between the major length of each neck bar 40 and the corresponding vertical member 22. Alternatively, a stop 44 may be engaged with either end of a neck bar 40 on a surface thereof that opposes the corresponding vertical member 22 as shown at least in FIG. 11 to achieve such a gap. It is contemplated that such a gap may prevent pinching or other discomfort to an animal 18 engaged with the livestock device 10 without limitation unless otherwise indicated in the following claims.

The neck bars 40 may be actuated between extended and retracted positions and/or any position therebetween via one or more actuators 14, which extension and retraction may cause the extension arms 30 to pivot with respect to both the door frames 20 and neck bars 40. The livestock device 10 may be configured such that the neck bars 40 remain generally vertical and parallel with respect to one another in both the retracted and extended positions and/or any position therebetween. Additionally, the extension arms 30 of a given pair thereof may remain generally parallel with respect to one another in both the retracted and extended positions and/or any position therebetween. It is contemplated that such a configuration may provide even pressure along the entire length of the neck bars 40 with respect to a portion of the animal 18 engaged therewith. However, other configurations and/or orientations for these elements may be used without limitation unless otherwise indicated in the following claims.

Figure 6:
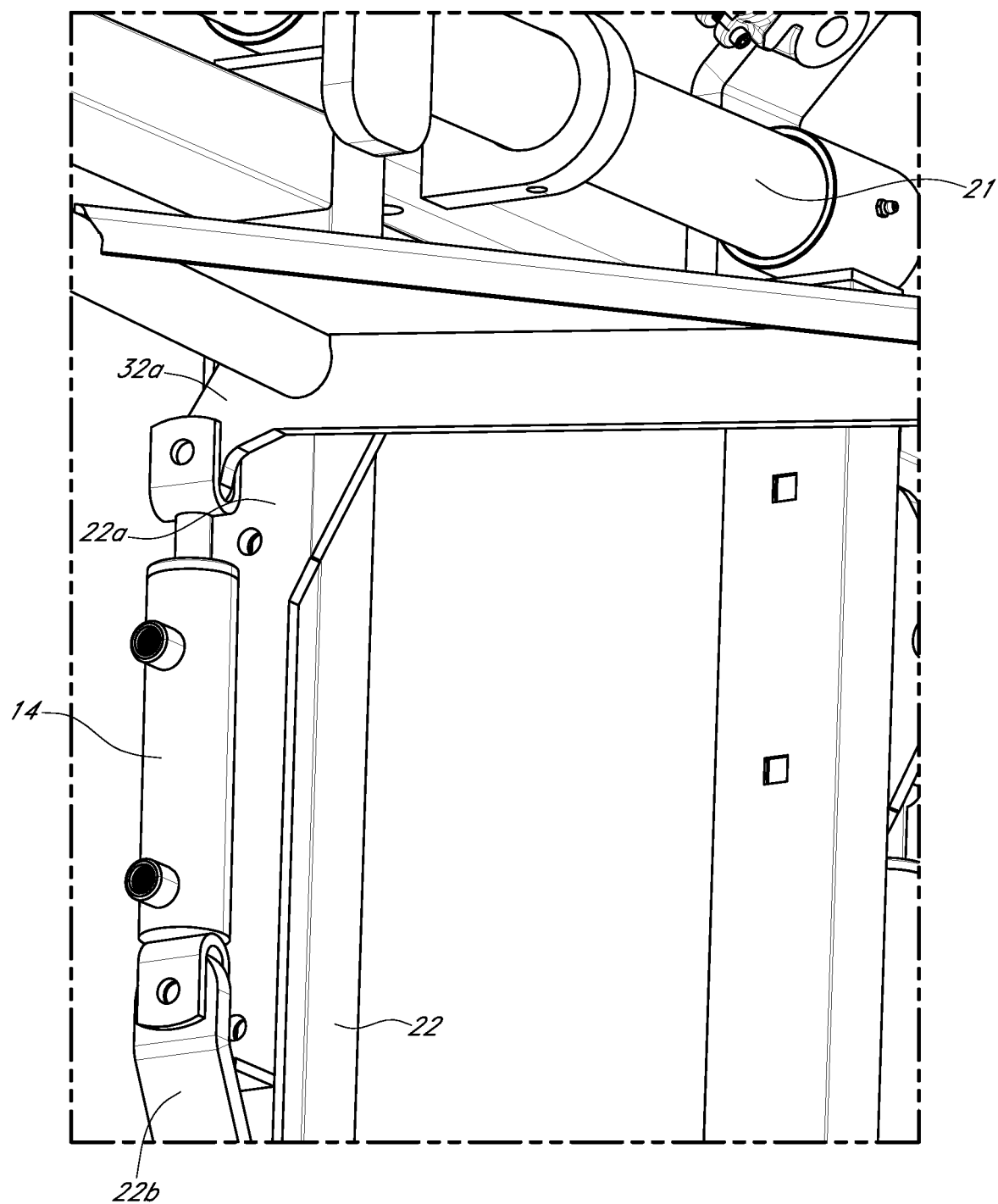
FIG. 6 is a detailed view of a portion of the livestock device shown in FIGS. 4A-5 adjacent an actuator and actuator tab.
Figure 7:
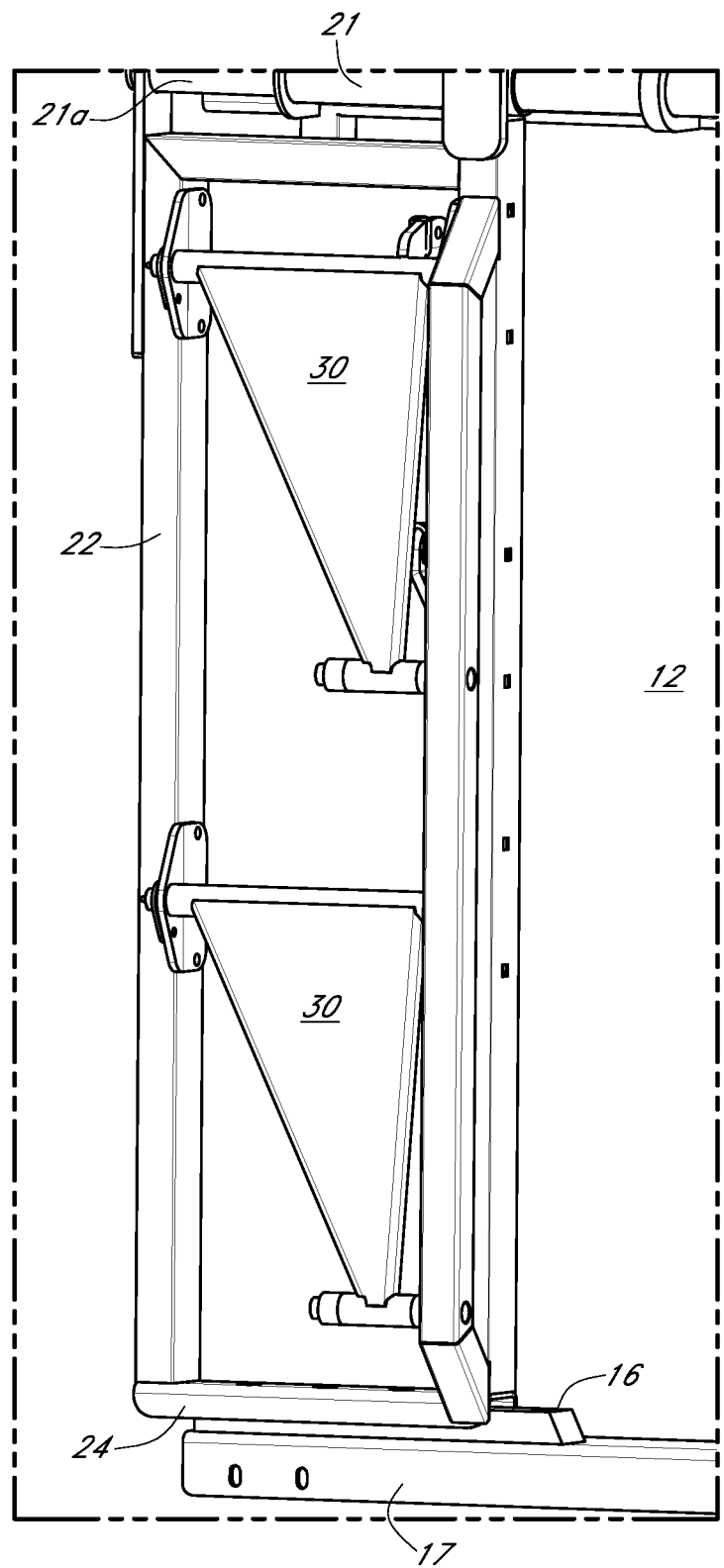
FIG. 7 is a detailed view of a one door frame and associated elements of the livestock device shown in FIGS. 4A-6.
Figure 8:
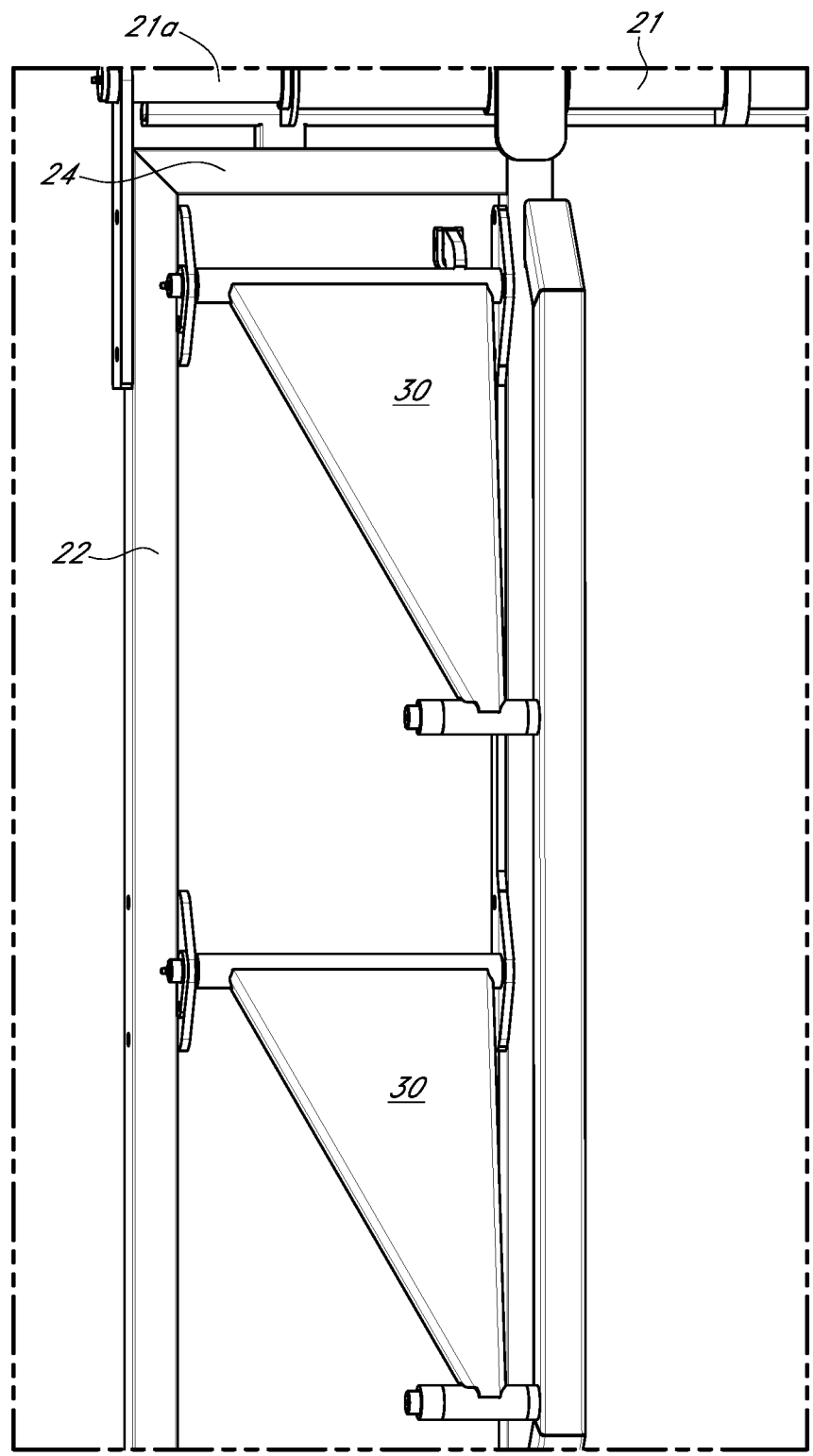
FIG. 8 is another detailed view of the one door frame and associated elements of the livestock device shown in FIG. 7.

As shown at least in FIG. 6, the second illustrative embodiment of the livestock device 10 may be configured with two actuators 14 for extending and retracting the neck bars 40 with respect to the door frames 40, wherein the actuators 14 may be hydraulically powered. The neck bars 40 are shown in the fully extended position in FIG. 4C and the fully retracted position in FIGS. 4A & 4B. One actuator 14 may be associated with a neck bar 40 on one door frame 20 and another actuator may be associated with the neck bar on the other door frame 20. A first end of one actuator 14 may be engaged with an actuator bracket 22b that that may be fixedly engaged with a vertical member 22 and a second end of that actuator 14 may be engaged with an actuator tab 32a on the arm first end 32, which actuator tab 32a may be fixedly engaged with the arm first end 32. Either the upper or lower extension arm 30 of a given pair may be configured with an actuator tab 32a unless otherwise indicated in the following claims, but it is contemplated that for many applications it may be advantageous to configure the upper extension arm 30 with an actuator tab 32a and engage the corresponding actuator 14 therewith (such that the actuator 14 may be positioned between the upper and lower extension arms 30 of a given pair thereof) to provide increased access to an animal 18 engaged with the livestock device 10 and/or to protect the actuator 14 from unwanted perturbations and/or otherwise reduce exposure of the actuator 14 and/or provide additional functional or aesthetic benefits.

The actuator tab 32a may be over center with respect to the pivot point between the extension arm 30 and the door frame 20 (which pivot point may be about the longitudinal axis of the corresponding rod 25 described in detail above). In this manner, extending the actuator 14 may cause the corresponding neck bar 40 to retract such that it is positioned adjacent the corresponding door frame 20 and retracting the actuator 14 may cause the corresponding neck bar 40 to extend such that is spaced apart from the corresponding door frame 20. Also in this manner, a first actuator 14 may power a first neck bar 40 and a second actuator 14 may power a second neck bar 40. It is contemplated that such a configuration (i.e., retracting the actuator 14 causing the corresponding neck bar 40 to extend from the corresponding door frame 20 and vice versa) may provide easier and/or increased access to an animal 18 engaged with the livestock device 10, and especially the neck and/or head area of the animal 18. However, the scope of the present disclosure is not so limited and extends to more than two or fewer than two actuators 14 as well as actuators 14 having different power sources (e.g., electric, pneumatic, etc.) without limitation unless otherwise indicated in the following claims.

From the foregoing description those skilled in the art should appreciate that the livestock device 10 disclosed herein may provide various benefits over the prior art. Those skilled in the art will appreciate that the livestock device 10 disclosed herein may allow for relatively easy securement of the position of, restraint, and/or proper orientation an animal 18, and/or securement of the position of, restraint, and/or proper orientation a portion of an animal 18 (e.g., its head, neck, etc.) with respect to another portion of the animal 18.

Illustrative Method of Use

In one illustrative method of use, the livestock device 10 may be used to secure the head of an animal 18 with respect to other portions of the animal 18, wherein the head of the animal 18 is positioned on a first side of the neck bars 40 opposite the chute 12 and the body and/or neck of the animal 18 is positioned on a second side of the neck bars 40 toward the chute 12 as shown in FIGS. 1-3. The neck and/or head of the animal 18 may be thus exposed for veterinary or other purposes without limitation unless otherwise indicated in the following claims.

It is contemplated that with the neck bars 40 in the generally retracted position, the user may open the door frames 20 to a distance such that the head of the animal 18 but not the body thereof may pass between the door frames 20. At this point the animal 18 may be positioned such that the head of the animal 18 is positioned on a first side of the neck bars 40 opposite the chute 12 and the body and/or neck of the animal 18 is positioned on a second side of the neck bars 40 toward the chute 12, and the user may close the door frames 20 slightly such that the head of the animal 18 may not pass between the door frames 18. At this point, the user may extend the neck bars 40 so as to expose and/or secure the head and/or neck of the animal 18. It is contemplated that the livestock device 10 disclosed herein may be safer and more comfortable for the animal 18 engaged therewith without limitation unless otherwise indicated in the following claims.

The various relative dimensions of the components of the livestock device 10 may be infinitely varied depending on the specific application of the livestock device 10. Several illustrative aspects of different livestock device 10 according to the present disclosure and relative dimensions of the components of the livestock device 10 are shown in the corresponding figures. However, these aspects and dimensions are not meant to be limiting in any sense, but rather are provided to show how the various dimensions of the livestock device 10 may be manipulated without departing from the spirit and scope of the present disclosure unless so indicated in the following claims.

It is contemplated that for certain applications of the livestock device 10, it may be especially advantageous to construct various elements thereof from box, channel, and/or tubular steel (e.g., the vertical and/or horizontal members 22, 24 of the door frames 20, portions of the extension arms 30, the neck bars 40, etc.). However, the livestock device 10 and various elements thereof may be constructed of any suitable material having any suitable cross-sectional shape and/or configuration known to those skilled in the art without limitation unless so indicated in the following claims.

Although various benefits/features of the illustrative embodiments of the livestock device 10 have been described herein in accordance with cattle, the scope of the present disclosure is not so limited. For example, the livestock device 10 may be configured for use with nearly any animal 18 (e.g., sheep, goats, swine, dogs, cats, etc.), or any other suitable application without limitation unless otherwise limited in the following claims.

From the preceding detailed description, it will be apparent to those of ordinary skill in the art that the present disclosure provides many benefits over the prior art. Some of those benefits include, but are not limited to unless otherwise indicated in the following claims: (1) parallel neck bars 40 and/or door frames 20 that remain parallel during actuation of various components of the livestock device 10; (2) neck bars 40 having a length similar to that of the door frames 20; (3) relatively easy removal, attachment, and/or adjustment of the extension arms 30 with respect to the door frames 20 and/or neck bars 40; (4) actuator 14 orientation with respect to the extension arms 30, neck bars 40, and/or door frames 20; (5) configuration of engagement between extension arms 30 and neck bars 40 and/or door frames 20; (6) elimination of pinch points between the neck bars 40 and door frames 20; (8) vertical orientation of neck bars 40 in both extended and retracted positioned and all points therebetween for constant pressure on an animal 18 or portion thereof adjacent the neck bars 40; (9) friction reducing elements (e.g., guide 16); and, (10) adjustability due to adding or removing bushings 35.

Although the descriptions of the illustrative aspects of the present disclosure have been quite specific, it is contemplated that various modifications could be made without deviating from the spirit and scope of the present disclosure. Accordingly, the scope of the present disclosure is not limited by the description of the illustrative aspects and/or corresponding figures unless so indicated in the following claims.

The number, configuration, dimensions, geometries, and/or relative locations of the various elements of the livestock device 10, will vary from one aspect of the present disclosure to the next, as will the optimal configuration thereof. Accordingly, the present disclosure is in no way limited by the specific configurations, dimensions, and/or other constraints of those elements unless so indicated in the following claims.

In the foregoing detailed description, various features are grouped together in a single embodiment for purposes of streamlining the disclosure. This method of disclosure is not to be interpreted as reflecting an intention that the present disclosure requires more features than are expressly recited in each claim. Rather, as the following claims reflect, inventive aspects lie in less than all features of a single foregoing disclosed embodiment. Thus, the following claims are hereby incorporated into this detailed description, with each claim standing on its own as a separate embodiment.

The materials used to construct the livestock device 10 and various elements and/or components thereof will vary depending on the specific application thereof, but it is contemplated that polymers, metals, metal alloys, natural materials, stone, cement, ceramics, fibrous materials, and/or combinations thereof may be especially useful for the livestock device 10 in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described the preferred embodiments of the various methods and apparatuses, other features of the present disclosure will undoubtedly occur to those versed in the art, as will numerous modifications and alterations in the various aspects as illustrated herein, all of which may be achieved without departing from the spirit and scope of the present disclosure. Accordingly, the methods and embodiments pictured and described herein are for illustrative purposes only, and the scope of the present disclosure extends to all method and/or structures for providing the various benefits and/or features of the present disclosure unless so indicated in the following claims. Furthermore, the methods and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the livestock device 10 and/or components thereof are not limited to the specific embodiments pictured and described herein, but are intended to apply to all similar apparatuses and methods positioning, securing retaining an animal 18 and/or one portion of an animal 18 with respect to another without limitation unless otherwise indicated in the following claims. Modifications and alterations from the described embodiments will occur to those skilled in the art without departure from the spirit and scope of the present disclosure.

Any of the various features, functionalities, aspects, configurations, etc. for livestock device 10 and/or components of any of the foregoing may be used alone or in combination with one another (depending on the compatibility of the features) from one embodiment and/or aspect of the livestock device 10 to the next. Accordingly, an infinite number of variations of the livestock device 10 exists. All of these different combinations constitute various alternative aspects of the livestock device 10. The embodiments described herein explain the best modes known for practicing the livestock device 10 and will enable others skilled in the art to utilize the same. The claims are to be construed to include alternative embodiments to the extent permitted by the prior art. Modifications and/or substitutions of one feature for another in no way limit the scope of livestock device 10 and/or component thereof unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

While the livestock device 10 and/or components thereof and/or methods of using same have been described in connection with preferred aspects and specific examples, it is not intended that the scope be limited to the particular embodiments and/or aspects set forth, as the embodiments and/or aspects herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

It should be noted that the present disclosure is not limited to the specific embodiments pictured and described herein, but are intended to apply to all similar apparatuses and methods to secure the position of, restrain, and/or properly orient an animal 18, and/or to secure the position of, restrain, and/or properly orient a portion of an animal 18 (e.g., its head, neck, etc.) with respect to another portion of the animal 18 and/or the like, and/or otherwise providing any of the features and/or advantages of any aspect of the present disclosure. Modifications and alterations from the described embodiments will occur to those skilled in the art without departure from the spirit and scope of the present disclosure.

What is claimed is:

1. A livestock device comprising:
   a. a first door frame;
   b. a second door frame, wherein said first and second door frames are moveable with respect to one another in a generally horizontal dimension such that said first and second door frames may be selectively positioned in an open and a closed position;
   c. an upper mount positioned above said first door frame;
   d. a telescoping member slideably engaged with said upper mount such that said upper mount and said telescoping member are moveable with respect to one another in a linear manner in said generally horizontal dimension;
   e. a base plate positioned under said first and second door frames;
   f. a first guide engaged with a top surface of said base plate, wherein said first guide engages a portion of said first door frame;
   g. a second guide engaged with said top surface of said base plate, wherein said second guide engages a portion of said second door frame;
   h. a first upper extension arm having a first end and a second end, wherein said first end is pivotally engaged with said first door frame;
   i. a first lower extension arm having a first end and a second end, wherein said first end is pivotally engaged with said first door frame, and wherein said first upper extension arm and said first lower extension arm are parallel with respect to one another;
   j. a second upper extension arm having a first end and a second end, wherein said first end is pivotally engaged with said second door frame;
   k. a second lower extension arm having a first end and a second end, wherein said first end is pivotally engaged with said second door frame, and wherein said second upper extension arm and said second lower extension arm are parallel with respect to one another;

l. a first neck bar having a first end and a second end, wherein said first neck bar is pivotally engaged with said second end of said first upper extension arm adjacent said first end of said first neck bar, and wherein said first neck bar is pivotally engaged with said second end of said first lower extension arm adjacent said second end of said first neck bar; and, m. a second neck bar having a first end and a second end, wherein said second neck bar is pivotally engaged with said second end of said second upper extension arm adjacent said first end of said second neck bar, wherein said second neck bar is pivotally engaged with said second end of said second lower extension arm adjacent said second end of said second neck bar, and wherein said first neck bar and said second neck bar are parallel with respect to one another.

2. The livestock device according to claim 1 wherein said first door frame is further defined as being rectangular and as comprising:
   a. an upper horizontal member having a first end and a second end;
   b. an inner vertical member having a first end and a second end, wherein said first end of said upper horizontal member is engaged with said first end of said inner vertical member;
   c. a lower horizontal member having a first and second end, wherein said first end of said lower horizontal member is engaged with said second end of said inner vertical member;
   d. an outer vertical member having a first and a second end, wherein said first end of said outer vertical member is engaged with said second end of said upper horizontal member, and wherein said second end of said outer vertical member is engaged with said second end of said lower horizontal member.

3. The livestock device according to claim 2 further comprising a slide tab engaged with said first door frame adjacent said first end of said upper horizontal member and said first end of said inner vertical member.

4. The livestock device according to claim 3 further comprising a first actuator having a first end and a second end, wherein said first end is engaged with said slide tab on said first door, and wherein said second end is engaged with said upper mount.

5. The livestock device according to claim 4 wherein said inner vertical member further comprises a first attachment tab and a second attachment table positioned below said first attachment tab, wherein said outer vertical member further comprises a third attachment tab and a fourth attachment tab positioned below said third attachment tab, wherein said first upper extension arm is further defined as being pivotally engaged with said first and third attachment tabs, and wherein said first lower extension arm is further defined as being pivotally engaged with said second and fourth attachment tabs.

6. The livestock device according to claim 5 further comprising a first rod, wherein said first rod is engaged with said first end of said first upper extension arm and said first and third attachment tabs.

7. The livestock device according to claim 6 further comprising a keeper positioned adjacent said third attachment tab.

8. The livestock device according to claim 7 wherein said first neck bar further comprises a spacer positioned on an inner surface thereof, wherein said spacer opposed said second neck bar.

9. The livestock device according to claim 8 wherein said first neck bar further comprises a first angled portion on said first end of said first neck bar, wherein said first angled portion is angled toward said first door frame.

10. The livestock device according to claim 1 wherein said first upper extension arm further comprises an actuator tab formed adjacent said first end of said first upper extension arm, wherein said first upper extension arm is pivotal with respect to said first door frame at a point between said actuator tab and said second end of said first upper extension arm.

11. The livestock device according to claim 10 further comprising a second actuator having a first end and a second end, wherein said first end of said second actuator is pivotally engaged with said first door frame and wherein a second end of said second actuator is pivotally engaged with said actuator tab.

12. The livestock device according to claim 11 wherein said second upper extension arm further comprises an actuator tab formed adjacent said first end of said second upper extension arm, wherein said second upper extension arm is pivotal with respect to said second door frame at a point between said actuator tab and said second end of said second upper extension arm.

13. The livestock device according to claim 12 further comprising a third actuator having a first end and a second end, wherein said first end of said third actuator is pivotally engaged with said second door frame and wherein a second end of said third actuator is pivotally engaged with said actuator tab on said second upper extension arm.

14. The livestock device according to claim 13 further comprising a bushing, wherein said bushing is positioned adjacent said first end of said first upper extension arm.

15. A method of restraining an animal, said method comprising the steps of:
   a. positioning said animal in a chute;
   b. positioning an anterior portion of said animal adjacent a first end of said chute, wherein said first end of said chute is engaged with a livestock device, said livestock device comprising:
      i. a first door frame;
      ii. a second door frame, wherein said first and second door frames are moveable with respect to one another in a generally horizontal dimension such that said first and second door frames may be selectively positioned in an open and a closed position;
      iii. an upper mount positioned above said first door frame;
      iv. a telescoping member slideably engaged with said upper mount such that said upper mount and said telescoping member are moveable with respect to one another in a linear manner in said generally horizontal dimension;
      v. a base plate positioned under said first and second door frames;
      vi. a first guide engaged with a top surface of said base plate, wherein said first guide engages a portion of said first door frame;
      vii. a second guide engaged with said top surface of said base plate, wherein said second guide engages a portion of said second door frame;
      viii. a first upper extension arm having a first end and a second end, wherein said first end is pivotally engaged with said first door frame;
      ix. a first lower extension arm having a first end and a second end, wherein said first end is pivotally engaged with said first door frame;

x. a second upper extension arm having a first end and a second end, wherein said first end is pivotally engaged with said second door frame;

xi. a second lower extension arm having a first end and a second end, wherein said first end is pivotally engaged with said second door frame;

xii. a first neck bar having a first end and a second end, wherein said first neck bar is pivotally engaged with said second end of said first upper extension arm adjacent said first end of said first neck bar, and wherein said first neck bar is pivotally engaged with said second end of said first lower extension arm adjacent said second end of said first neck bar; and, xiii. a second neck bar having a first end and a second end, wherein said second neck bar is pivotally engaged with said second end of said second upper extension arm adjacent said first end of said second neck bar, and wherein said second neck bar is pivotally engaged with said second end of said second lower extension arm adjacent said second end of said second neck bar;

c. spacing said first door frame from said second door frame by an amount sufficient to allow a head of said animal to pass through a space between said first door frame and said second door frame;

d. positioning said head of said animal on a first side of said first door frame, wherein said first side of said first door frame is positioned opposite said chute;

e. moving said first door frame and said second door frame toward one another such that said head of said animal cannot pass between said first door frame and said second door frame; and, f. extending said first neck bar and said second neck bar away from said first door frame and said second door frame, respectively, to expose a portion of a neck of said animal.

16. The method according to claim 15 wherein said first neck bar and said second neck bar are further defined as being parallel with respect to one another during said step of extending said first and said second neck bars away from said first and said second door frames.

17. The method according to claim 16 wherein said first upper extension arm and said first lower extension are further defined as being parallel with respect to one another during said step of extending said first and said second neck bars away from said first and said second door frames.

18. The method according to claim 17 wherein said livestock device further comprises a first actuator having a first end and a second end, wherein said first end of said first actuator is pivotally engaged with said first door frame, and wherein said second end of said first actuator is pivotally engaged with said first upper extension arm adjacent said first end of said first upper extension arm.

19. The method according to claim 18 wherein said first actuator and said first upper extension arm are further defined as being configured such that extending said first actuator causes said second end of said first upper extension arm to move toward said first door frame.

20. The method according to claim 19 wherein said first end of said first upper extension arm is engaged with said first door frame at a point between said second end of said first upper extension arm and said second end of said first actuator.

* * * * *